United States Patent
Torres et al.

(10) Patent No.: US 12,467,246 B2
(45) Date of Patent: Nov. 11, 2025

(54) AUTOMATIC SANITARYWARE ASSEMBLY AND SYSTEMS

(71) Applicant: AS America, Inc., Piscataway, NJ (US)

(72) Inventors: Karl Torres, Columbus, NJ (US); Claudia Marcela Jovel, Spring, TX (US); Ki Bok Song, Plainview, NY (US); Soonjae Kwon, Astoria, NY (US); Joseph John Ientile, Port Murray, NJ (US); Stanimir Stoynov, Westfield, NJ (US)

(73) Assignee: AS America, Inc., Piscataway, NJ (US)

( * ) Notice: Subject to any disclaimer, the term of this patent is extended or adjusted under 35 U.S.C. 154(b) by 329 days.

(21) Appl. No.: 18/024,130

(22) PCT Filed: Sep. 7, 2021

(86) PCT No.: PCT/US2021/049298
§ 371 (c)(1),
(2) Date: Mar. 1, 2023

(87) PCT Pub. No.: WO2022/055889
PCT Pub. Date: Mar. 17, 2022

(65) Prior Publication Data
US 2023/0272606 A1   Aug. 31, 2023

Related U.S. Application Data

(60) Provisional application No. 63/075,371, filed on Sep. 8, 2020.

(51) Int. Cl.
*E03D 5/10*   (2006.01)
(52) U.S. Cl.
CPC .................................. *E03D 5/105* (2013.01)

(58) Field of Classification Search
CPC ...................................................... E03D 5/105
See application file for complete search history.

(56) References Cited

U.S. PATENT DOCUMENTS

| | | | |
|---|---|---|---|
| 4,839,039 A * | 6/1989 | Parsons ................ | A47K 5/1217 210/143 |
| 2015/0167280 A1* | 6/2015 | Le ........................... | E03C 1/057 251/129.04 |

(Continued)

FOREIGN PATENT DOCUMENTS

| WO | WO-2017111735 A1 * | 6/2017 | ............. C04B 33/34 |
|---|---|---|---|
| WO | WO-2020028798 A1 * | 2/2020 | ............... E03C 1/00 |

OTHER PUBLICATIONS

WO 2017111735 (Year: 2017).*

(Continued)

*Primary Examiner* — Lauren A Crane
(74) *Attorney, Agent, or Firm* — Tyler A. Stevenson; Anna-Lisa L. Gallo

(57) ABSTRACT

A flush valve assembly for an automatic sanitaryware assembly, comprising a flush valve; a status sensor; a presence sensor associated with a presence sensor lens; an antenna associated with an antenna lens; a manual override actuator; and a controller. A status sensor may comprise an ultrasonic sensor or a capacitive sensor and is configured to be affixed to a sanitaryware assembly. The status sensor is configured to communicate with the controller, the controller is configured to determine a sanitaryware status, and the antenna is configured to transmit the sanitaryware status to a network gateway.

18 Claims, 9 Drawing Sheets

(56) References Cited

U.S. PATENT DOCUMENTS

| | | | | |
|---|---|---|---|---|
| 2016/0201311 A1* | 7/2016 | Guler | ................ | H04Q 9/00 |
| | | | | 340/870.07 |
| 2017/0198464 A1* | 7/2017 | Hall | ................ | E03D 11/02 |
| 2018/0010322 A1 | 1/2018 | Grover et al. | | |
| 2018/0037007 A1* | 2/2018 | Droste | ............ | B32B 17/10036 |
| 2019/0103660 A1* | 4/2019 | Zimmerman | ........ | H01Q 19/06 |

OTHER PUBLICATIONS

WO 2020028798 (Year: 2020).*
PCT/US2021/049298 International Search Report, 3 pages, dated Dec. 23, 2021.

* cited by examiner

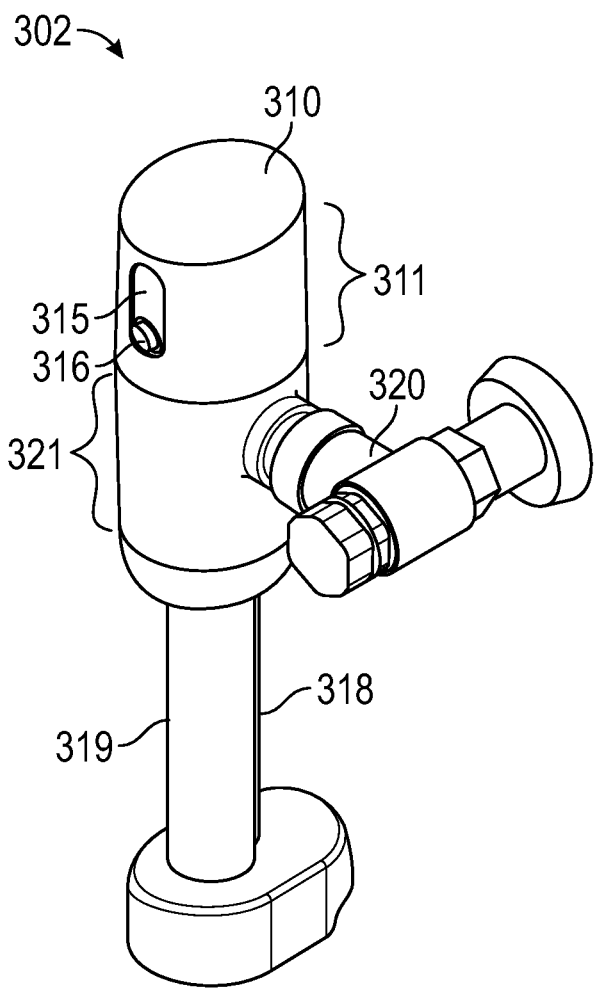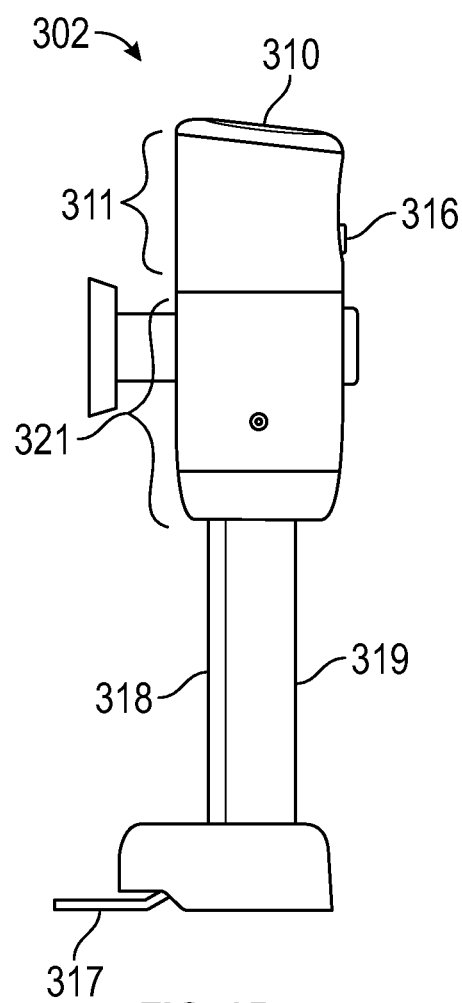
FIG. 3A
FIG. 3B

AUTOMATIC SANITARYWARE ASSEMBLY AND SYSTEMS

The description relates to connected sanitaryware assemblies and systems.

BACKGROUND

Water conservation is a concern for numerous economic and environmental reasons. Dual flush technology provides operators with a "low volume" flush option (usually about 2 to about 4.5 liters) and a "high volume" flush option (usually about 4 to about 9 liters). The option selected depends on the contents of the toilet bowl after use, with the flush disposal of liquid waste requiring only use of a "low volume" option while a "high volume" option could be used for solid waste disposal. However, a dual flush toilet limits the selection of volumes to two discrete amounts, "low" and "high" flush volumes. Further, a dual flush toilet leaves the selection of the volume to the discretion of the operator, who may choose a "high" flush volume when a "low" flush volume otherwise would suffice.

Furthermore, when a toilet malfunctions, such as when there is a clog, constant flush condition, and/or failure of a toilet component, water may continually run into the bowl or may not exit the bowl. This may all lead to wasting of water, resources, money, and/or damage to the toilet, bathroom and/or building. Therefore, a need exists for sanitaryware which may determine the contents of the toilet and flush the appropriate water level. A need further exists for sanitaryware which may communicate with other devices to operate in a manner that controls water flow through a device. A further need exists for connected sanitaryware systems and methods. A further need exists for connected sanitaryware having improved sensing and wireless communication.

SUMMARY

Accordingly, disclosed is a flush valve assembly for an automatic sanitaryware assembly, the flush valve assembly comprising a flush valve; a status sensor; a presence sensor associated with a presence sensor lens; an antenna associated with an antenna lens; a manual override actuator; and a controller, wherein the status sensor comprises one or more sensors selected from ultrasonic sensors and capacitive sensors, the status sensor, the presence sensor, and the antenna are in wired electrical communication with the controller, the status sensor is configured to be affixed to a sanitaryware assembly, the status sensor is configured to transmit signals to the controller, the controller is configured to analyze the signals and to determine a sanitaryware status based on the analysis, and the antenna is configured to transmit the sanitaryware status to a network gateway.

Also disclosed is an automatic sanitaryware assembly comprising the flush valve assembly, and having the status sensor coupled to the sanitaryware and configured to communicate with the controller.

In some embodiments, a status sensor may be an ultrasonic sensor or a capacitive sensor. An automatic sanitaryware assembly may comprise a toilet, a bidet, or a urinal.

BRIEF DESCRIPTION OF THE DRAWINGS

The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

FIG. 3A, FIG. 3B and FIG. 3C show views of an exposed flush valve assembly, according to an embodiment.

DETAILED DESCRIPTION

Figure 1C:
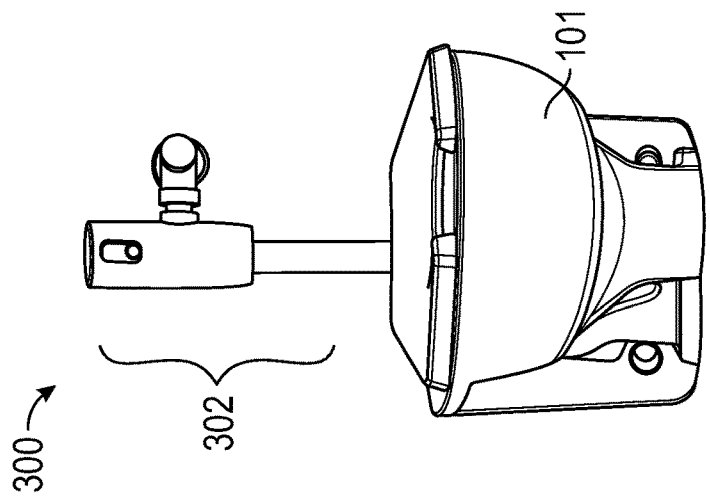
FIG. 1A, FIG. 1B, and FIG. 1C show various sanitaryware assemblies, according to some embodiments.
Figure 1B:
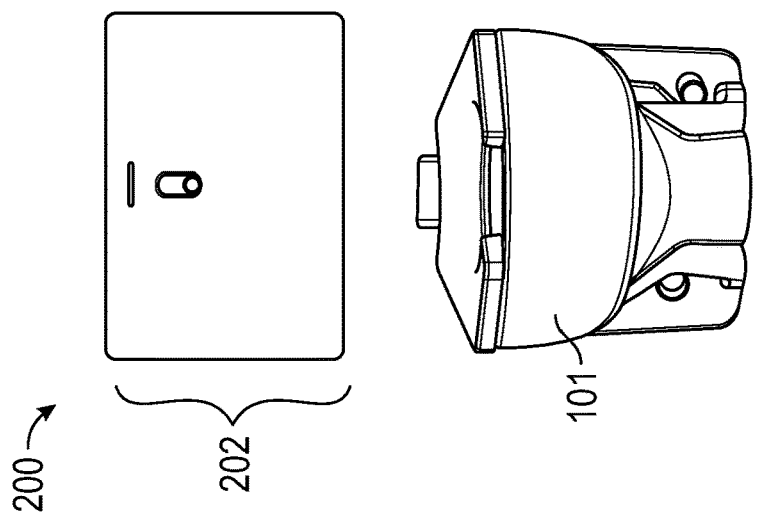
Figure 1A:
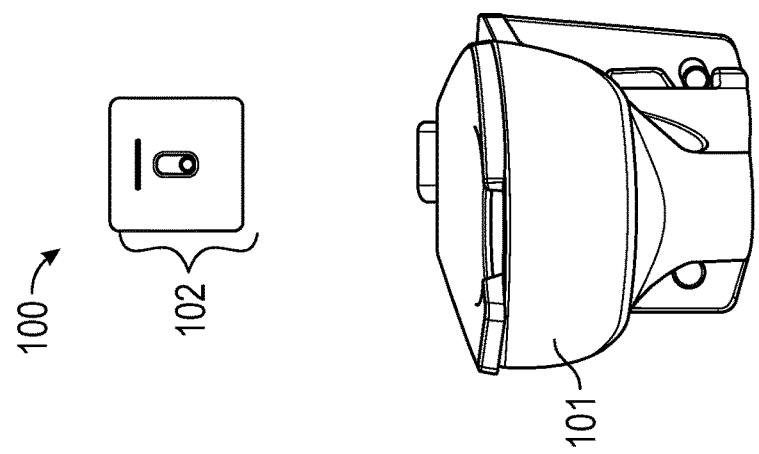

FIG. 1A, FIG. 1B, and FIG. 1C show wall-hung automatic toilet assemblies 100, 200, and 300, respectively, according to some embodiments. Automatic toilet assembly 100 comprises wall-hung bowl 101 and concealed flush valve assembly 102. Automatic toilet assembly 200 comprises wall-hung bowl 101 and concealed flush valve assembly 202. Automatic toilet assembly 300 comprises wall-hung bowl 101 and exposed flush valve assembly 302.

Figure 2A:
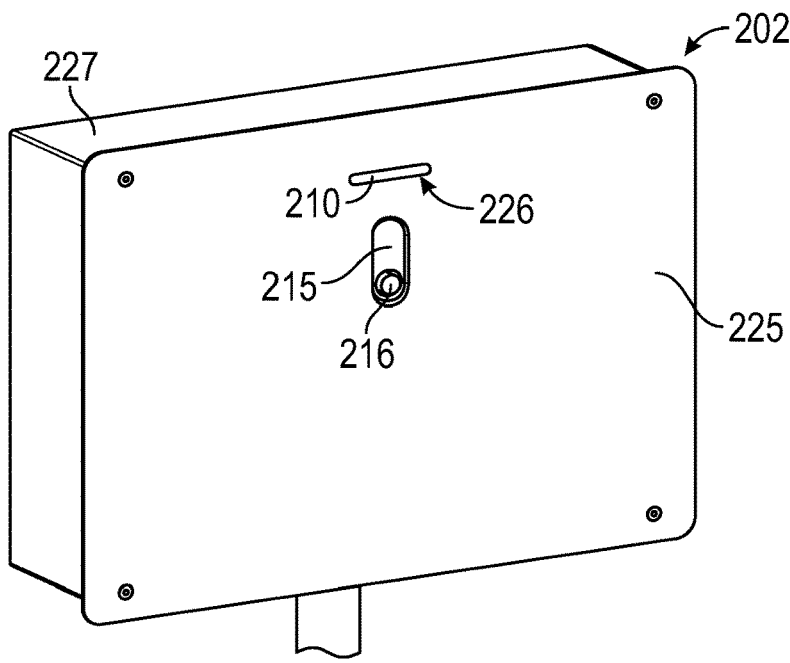
FIG. 2A shows a concealed flush valve assembly, according to an embodiment.
Figure 2B:
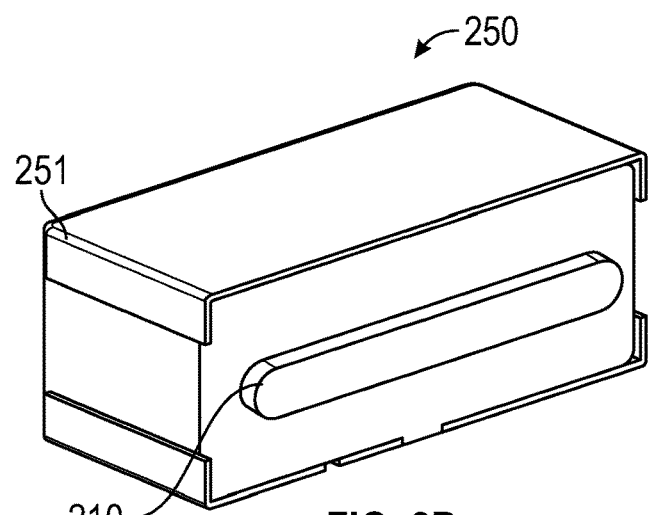
FIG. 2B and FIG. 2C depict a slot antenna assembly, according to an embodiment.
Figure 2C:
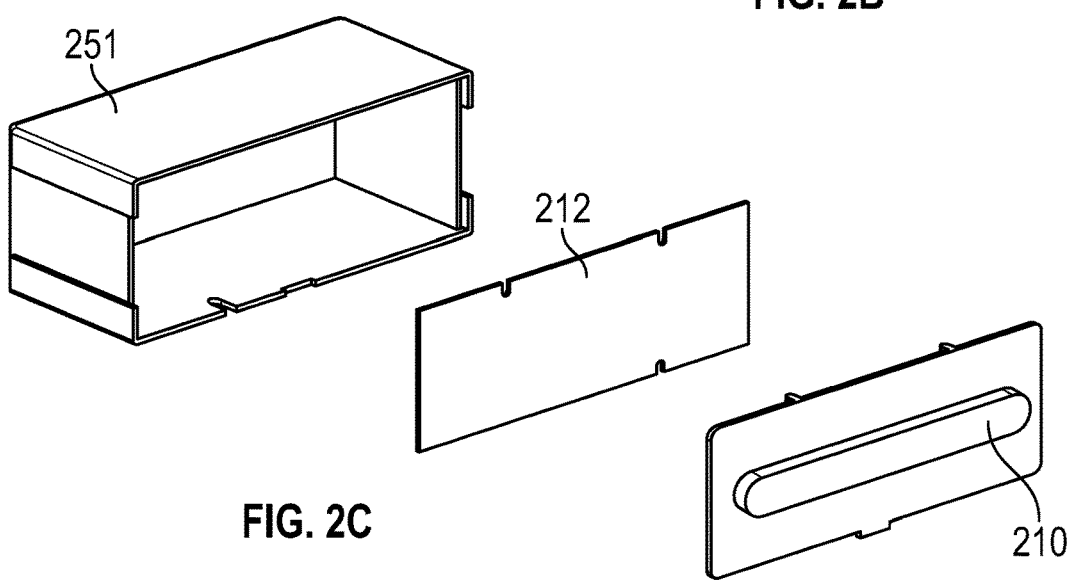

FIG. 2A shows concealed flush valve assembly 202, according to an embodiment. Large plate 225 comprises antenna lens 210, thermoplastic presence sensor lens 215, and electric manual override button 216. Lens 215 is visible in substantially rectangular-shaped, horizontally-aligned plate aperture 226. Concealed housing 227 contains a presence sensor, antenna, water source, valve inlet, valve outlet pipe, controller, all not visible. FIG. 2B shows antenna assembly 250, which is contained by housing 227. FIG. 2C shows an exploded view of antenna assembly 250, comprising antenna box 251, antenna 212 and lens 210. Electric components may be wired to a battery or, alternatively, wired to a building power source.

Figure 3C:
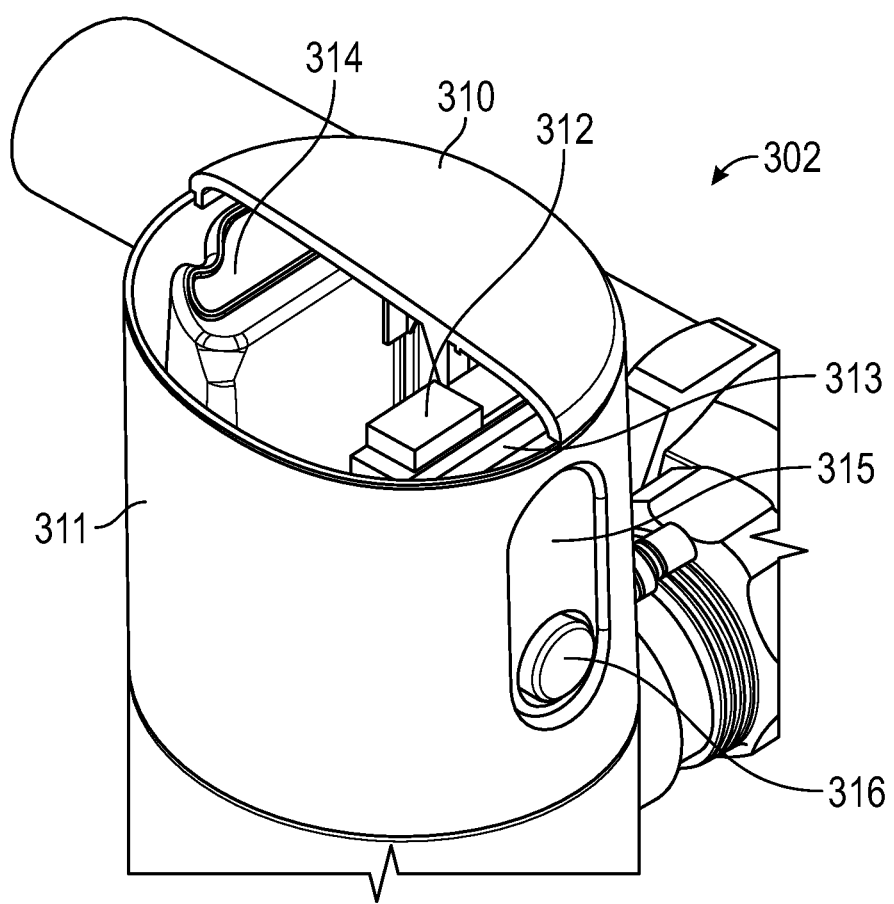

FIG. 3A, FIG. 3B, and FIG. 3C provide views of exposed flush valve assembly 302, according to an embodiment. Valve assembly 302 comprises thermoplastic antenna lens 310 coupled to upper housing 311. Antenna lens 310 is a cap covering upper housing 311. Upper housing 311 may comprise a metal such as zinc. As shown in FIG. 3C with thermoplastic lens 310 cut-away, upper housing 311 contains antenna 312, controller 313, and battery housing 314. Upper housing 311 also contains presence sensor lens 315 and electric manual override button 316. A presence sensor (not visible) is positioned in upper housing 311 behind lens 315. Antenna 312, controller 313, and override button 316 are in wired electronic communication with a battery in housing 314. Controller 313 is electrically connected to an ultrasonic sensor on bowl 101 underside exterior (not shown) via wire 317. Wire 317 runs from an ultrasonic sensor on bowl 101 through cable housing 318 coupled to a rear of outlet pipe 319. Inlet 320 is in fluid communication with outlet pipe 319 and a water source. Lower housing 321 contains an electromechanical valve (not visible), which valve is electrically connected to a battery in housing 314 and override button 316. Lower housing 321 may also comprise a metal such as zinc.

Figure 4A:
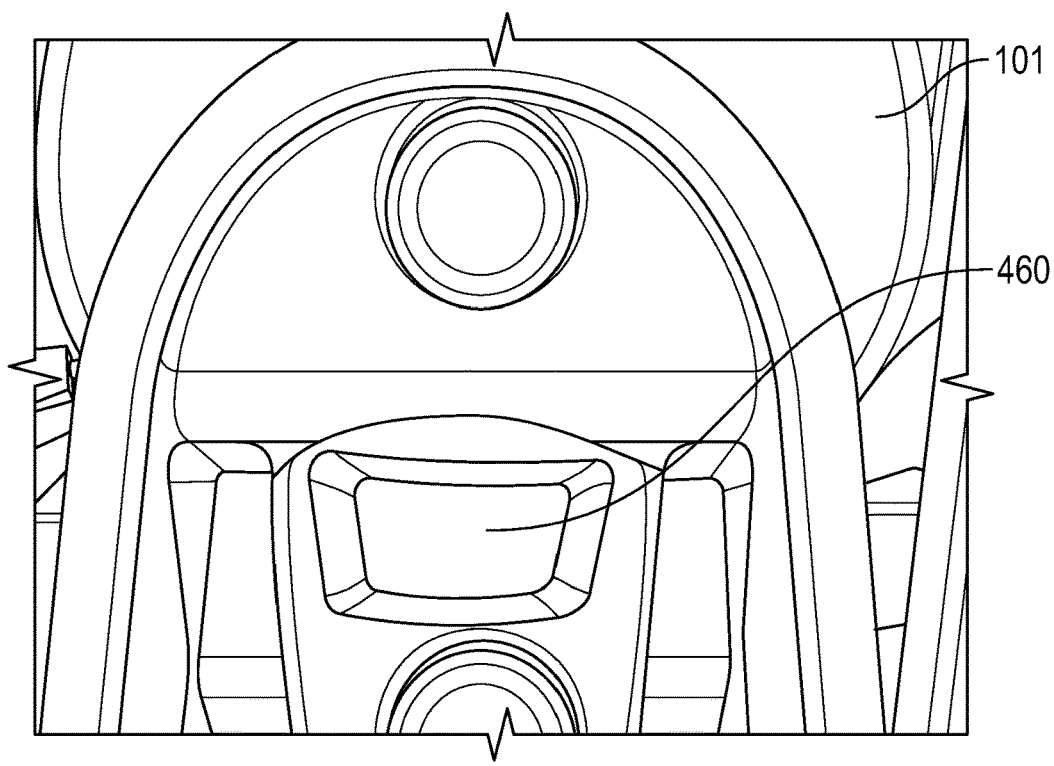
FIG. 4A and FIG. 4B show views of a toilet bowl, according to some embodiments.
Figure 4B:
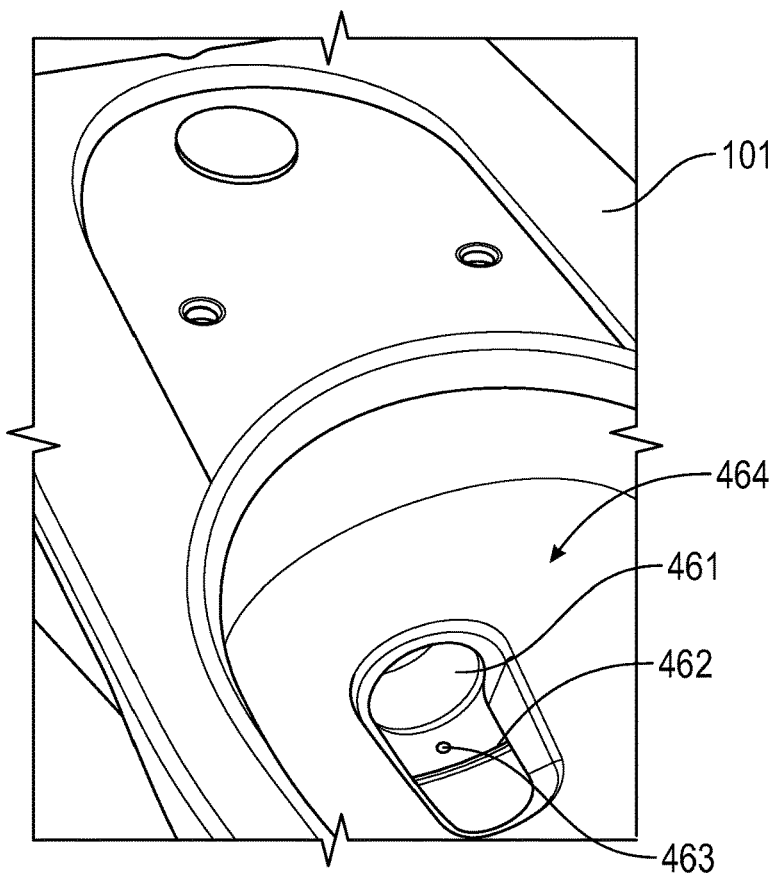

FIG. 4A shows an underside view of toilet bowl 101, according to an embodiment. Bowl 101 comprises recess 460 configured to receive an ultrasonic sensor. An ultrasonic sensor may be affixed to bowl via an adhesive. Recess 460 is machined to remove glaze. FIG. 4B provides a top view of bowl 101, according to an embodiment. Bowl 101 comprises sump area 464 where a water seal is present between flush cycles. A water seal will completely cover trapway inlet 461 and jet outlet 462. During a flush, flush water will exit jet outlet 462, enter sump area 464, and exit bowl via trapway inlet 461 to a trapway and on to a waste line. Recess 460 configured to receive an ultrasonic sensor is positioned and substantially centered under point 463 between trapway inlet 461 and sump outlet 462.

Figure 4C:
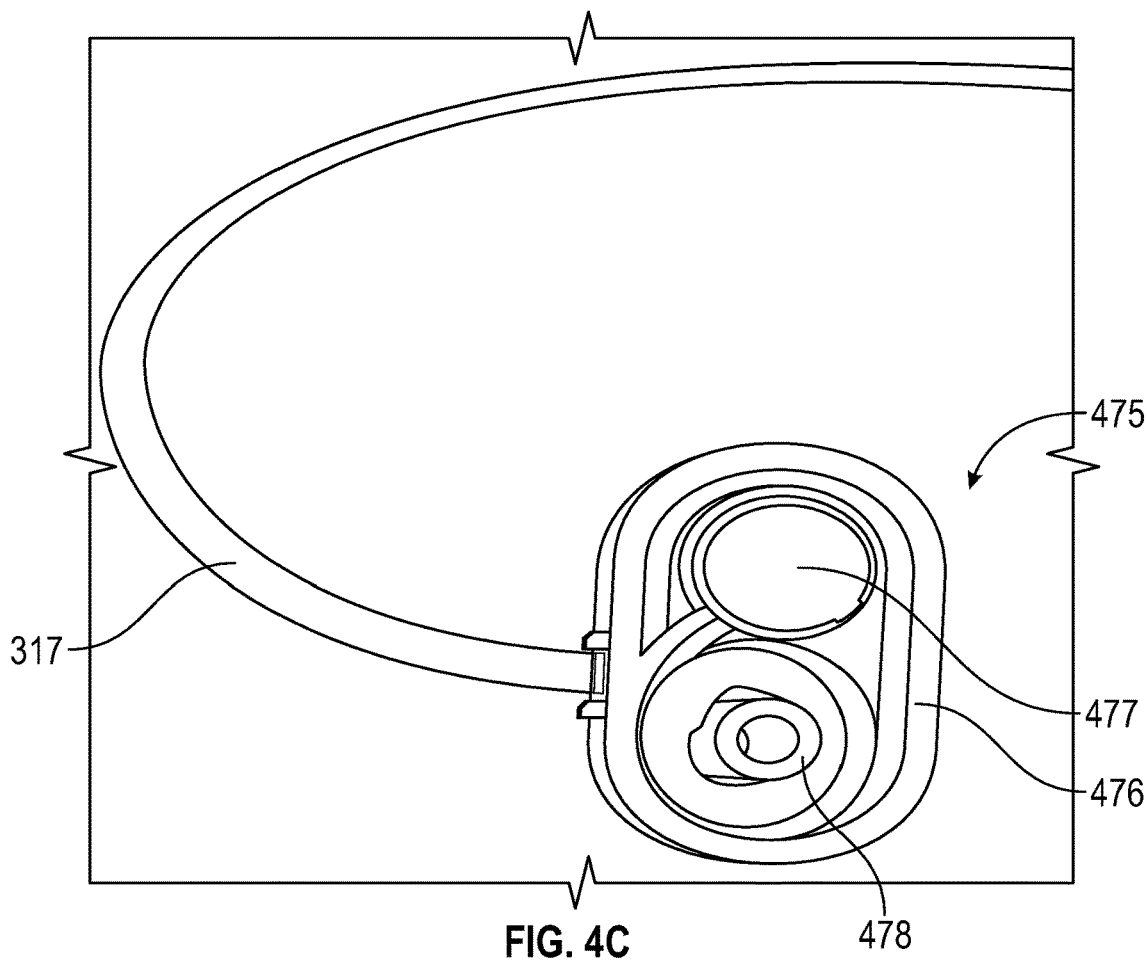
FIG. 4C and FIG. 4D show an ultrasonic sensor prior to being coupled to, and coupled to a toilet bowl, according to some embodiments.
Figure 4D:
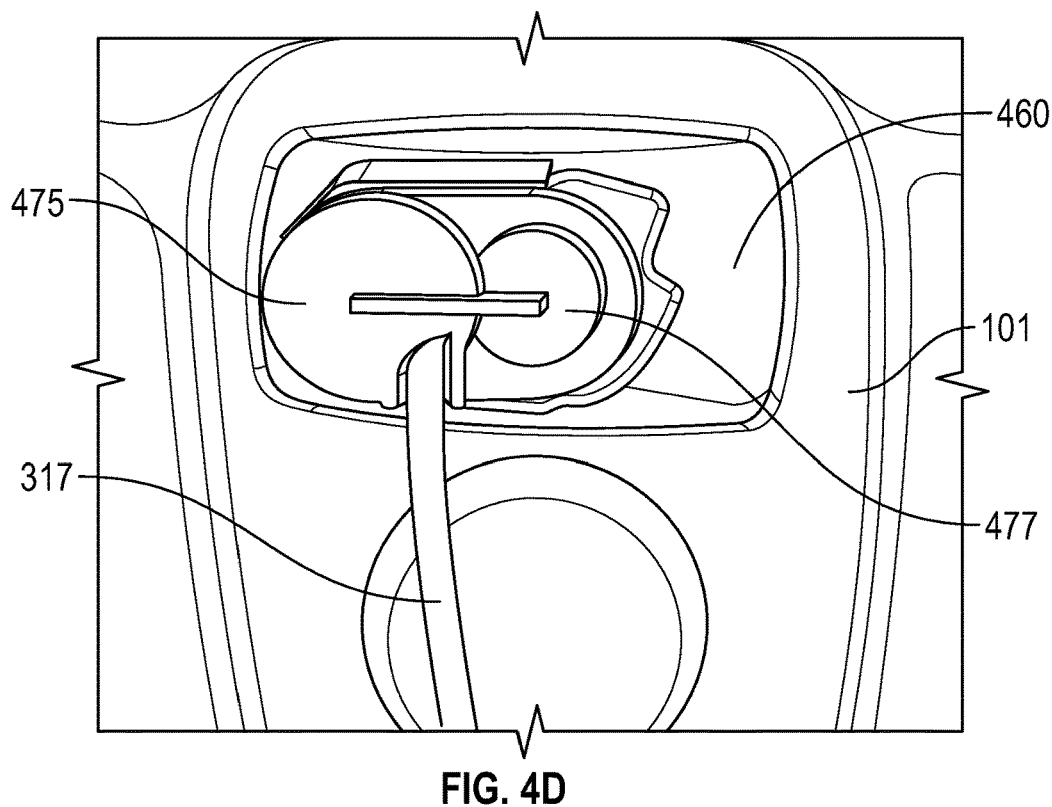

FIG. 4C and FIG. 4D provide a view of ultrasonic sensor assembly 475 (a piezo ultrasonic transducer), according to an embodiment. In this embodiment, a 2-part methylmethacylate adhesive is applied to outer ring 476 and on transducer part 477; and an alkylcyanoacrylate adhesive is applied to ring feature 478. Sensor assembly 475 is affixed by hand to recess 460. Transducer part 477 is substantially directly centered under point 463. Wire 317 electrically connects sensor assembly 475 and a controller associated with a flush valve.

Figure 4E:
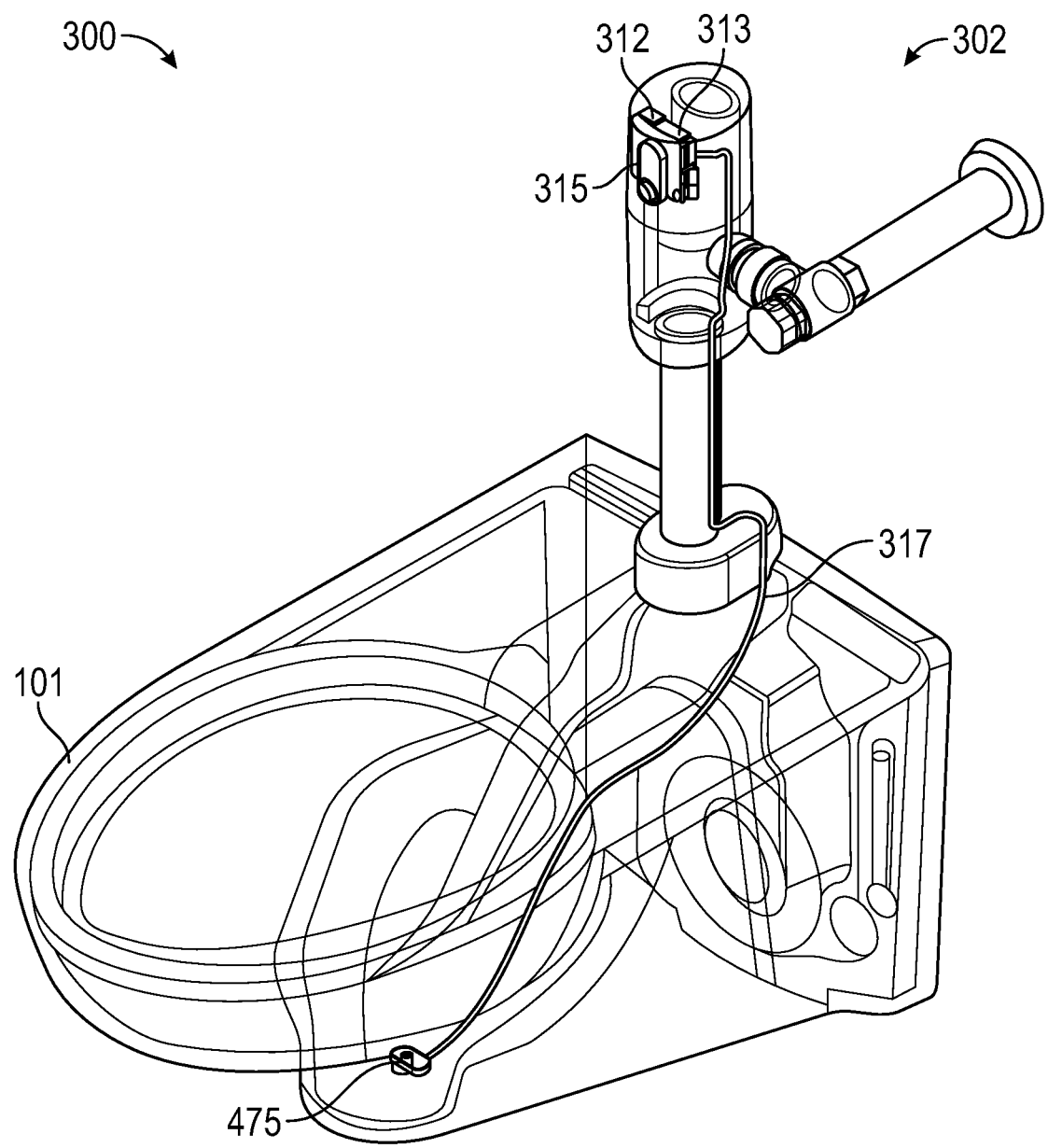
FIG. 4E and FIG. 4F provide see-through views of a toilet assembly and a urinal assembly, respectively, according to some embodiments.

FIG. 4E provides a see-through view of toilet assembly 300, according to an embodiment. Exposed flush valve assembly 302 is coupled to bowl 101. Shown are antenna 312, controller 313, and presence sensor lens 315. Electric wire 317 electrically couples ultrasonic sensor assembly 475 with controller 313. Controller 313 is also electrically coupled to a battery and a solenoid valve of assembly 302, each not visible, as well as with a presence sensor positioned behind lens 315.

Figure 4F:
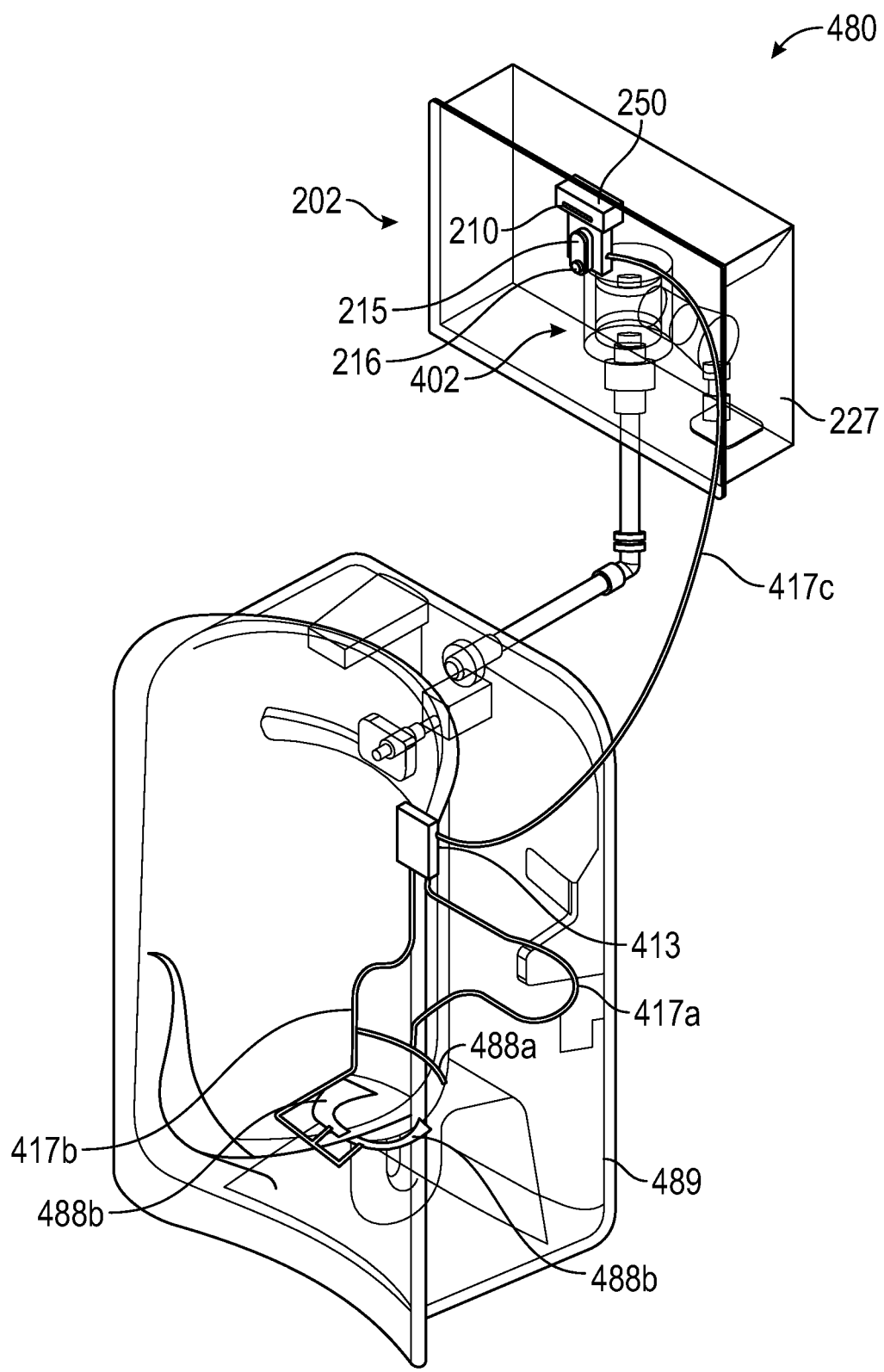

FIG. 4F provides a see-through view of urinal assembly 480, according to an embodiment. Assembly 480 comprises concealed valve assembly 202 and urinal 489. Partially visible is concealed flush valve assembly 402. Visible are housing 227, antenna assembly 250, antenna lens 210, lens 215, and manual override button 216. Also shown are controller 413, positioned behind and attached to a rear of urinal 489. Controller 413 is electrically coupled to the presence sensor via wire 417c. Controller 413 is also electrically coupled to capacitive sensor 488a positioned on a rear wall of urinal 489 via wire 417a, and to capacitive sensor assembly 488b, positioned on a bottom underside of the basin of urinal 489, via wire 417b. Capacitive sensor assembly 488b may be configured to detect and communicate a "slow drain" event. Capacitive sensor assembly 488b comprises two mirror-image parts. Capacitive sensor 488a may be configured to detect an overflow event. In this embodiment, sensor 488a is positioned at or near a top level of the urinal basin. Status sensors may be applied to a urinal as is the toilet sensor assembly. The capacitive sensors generally comprise a pair of electrodes.

Figure 5:
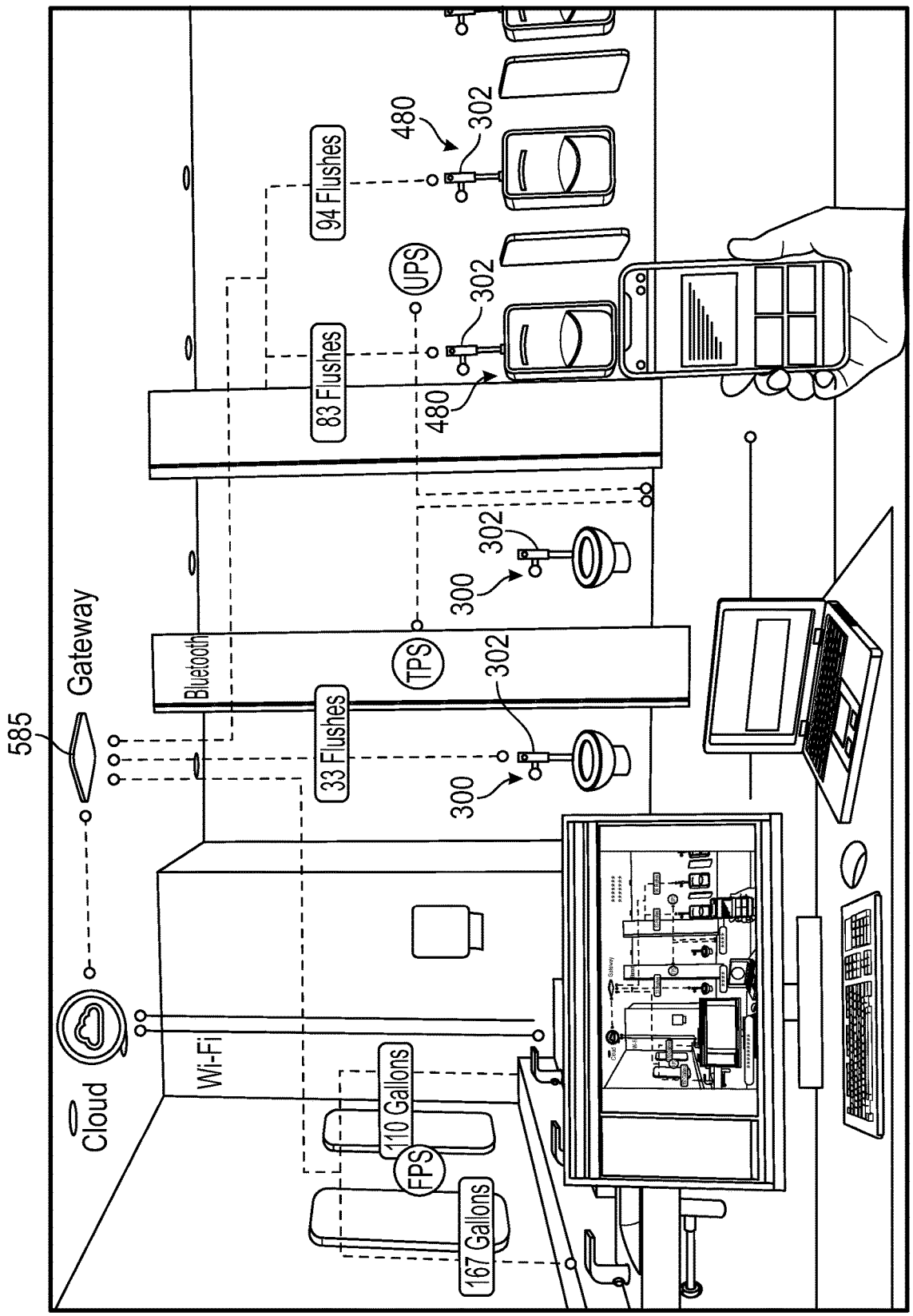
FIG. 5 depicts a connected system comprising connected sanitaryware, according to some embodiments.

FIG. 5 shows a connected bathroom, according to an embodiment. Shown are toilet assemblies 300 and urinal assemblies 580, each comprising exposed flush valve assemblies 302. Flush valve assemblies 302 are in wireless communication with network gateway 585 via an antenna.

Sanitaryware includes toilets, urinals, bidets, spalets, and the like. Also subject of the disclosure are toilet and urinal assemblies as described herein.

In some embodiments, a flush valve assembly may be an exposed flush valve assembly and may comprise an upper housing and a lower housing. An upper housing may comprise, be coupled to, or contain features including an antenna, an antenna lens, a presence sensor, a presence sensor lens, a manual override actuator, or a controller. An upper and lower housing may comprise a substantially cylinder-like shape. In some embodiments, an upper housing may comprise a battery. An exposed flush valve assembly lower housing may contain an electromechanical flush valve. In some embodiments, an exposed flush valve assembly upper and/or lower housing may comprise a metal, for example zinc or stainless steel.

In some embodiments, a flush valve assembly may be a concealed flush valve assembly comprising a plate configured to be positioned on a bathroom wall near (e.g. above) a sanitaryware device. A plate may conceal and/or be associated with or coupled to a flush valve assembly comprising an electromechanical flush valve, water inlet, water outlet, antenna, antenna lens, presence sensor, presence sensor lens, manual override actuator, controller, or battery. In some embodiments, a plate may comprise zinc or stainless steel.

In some embodiments, a flush valve assembly may be powered by a battery. In other embodiments, a flush valve assembly may be powered by a building electric supply or both.

In some embodiments, a flush valve may be an electromechanically operated valve. In some embodiments, a flush valve may comprise a solenoid valve. A flush valve assembly may comprise a water inlet in fluid communication with a water source. A flush valve assembly may comprise a water outlet fluidly coupled to a sanitaryware fixture. In some embodiments, a flush valve assembly may comprise an angle stop.

In some embodiments, an electromechanical valve, a sensor assembly, a presence sensor, a controller, and a power source (e.g. a battery) are all in electrical communication and electrically coupled.

An ultrasonic sensor may be a piezo ultrasonic transducer, for example a piezo-ceramic transducer. A flush valve assembly comprises a presence sensor associated with a presence sensor lens. In some embodiments, a presence sensor may be an infrared (IR) sensor. A flush valve assembly comprises an antenna configured to communicate with a network gateway. A flush valve assembly comprises a manual override actuator, which may be a push-button, lever, switch, and the like.

In some embodiments, a network gateway is configured to communicate with a cloud/server and/or with a computing device via a cloud/server. Computing devices may include smartphones, laptop computers, etc. A flush valve assembly comprises a controller (microcontroller). A controller may be in electrical (wired) communication with a status sensor, a presence sensor, and an antenna. An antenna is in wireless (e.g. BLUETOOTH) communication with a network gateway and/or an internet-connected device such as a smartphone, laptop, other sanitaryware, other computing devices, and the like.

In some embodiments, an exposed flush valve upper housing may be coupled to an antenna lens, wherein an antenna is positioned below the lens. An antenna may sit on and be coupled to a controller. In some embodiments, an exposed flush valve upper housing may comprise a cap, wherein the cap is the antenna lens. In some embodiments, a concealed flush valve assembly plate may comprise an aperture comprising an antenna lens. In some embodiments, a plate aperture may be a horizontal slot, for example a substantially rectangular-shaped, horizontally-aligned opening. In some embodiments, a concealed flush valve assembly may comprise an antenna box, wherein an open end of the box is coupled to an antenna and the antenna is positioned behind an antenna lens.

In some embodiments, an antenna lens comprises a thermoplastic polymer, for example one or more of a polyolefin, a polyamide, a polystyrene, a polyester, a polycarbonate, a polyacrylate, an elastomer, copolymers thereof, or blends thereof. In some embodiments, an antenna lens may comprise acrylonitrile-butadiene-styrene (ABS) copolymer or acrylonitrile-styrene-acrylate (ASA) copolymer.

An exposed flush valve assembly upper housing and a concealed flush valve assembly plate comprises an aperture comprising a presence sensor lens, wherein the presence sensor is positioned behind the lens. A presence sensor lens may also comprise a thermoplastic polymer as above. An exposed flush valve assembly upper housing and a concealed flush valve assembly plate may comprise a manual override actuator. In some embodiments, an exposed flush valve assembly upper housing and concealed flush valve assembly plate may comprise an LED indicator light. An LED indicator light may indicate battery life, status of sanitaryware, etc.

In some embodiments, an ultrasonic sensor may be coupled to an interior or an exterior of a bowl to receive liquid or solid waste. An ultrasonic sensor may be configured to emit ultrasonic signals through water contained in a bowl, and receive ultrasonic signals reflected back. In some instances, ultrasonic signals are reflected back to a sensor from an unobstructed water surface (water seal surface). A water surface obstructed by solids may scatter or absorb signals, such that they are not reflected back to a sensor. A controller, having collected the information from an ultrasonic sensor, may determine a time-of-flight (ToF) of the signal or signals. A controller may compare a measured ToF to a standard ToF to determine bowl contents (bowl status), liquid or solid. Accordingly, a controller may then instruct a flush valve to initiate a low volume flush or a high volume flush.

In some embodiments, a status sensor may be in a "sleep" mode, that is, not emitting or receiving signals and/or communicating the signals to a controller. Upon a presence sensor determining that a user is present, a controller may instruct a status sensor to "wake up" and transmit and receive signals and relay the information to a controller. In some embodiments, a sleep mode may include periodic (regular or irregular intervals) "waking", where a sensor will emit and receive signals to check for proper water seal level and/or object/solids presence. For instance, a case of infrequent use, if it is determined that a water seal has partially or completely evaporated, a controller may instruct initiation of one or more flush cycles to re-fill the bowl.

In some embodiments, an assembly may comprise or more flow sensors or flow rate sensors for detecting a flow of fluid through an angle stop, through a flush valve, or through the sanitaryware, etc. In some embodiments, an assembly may comprise one or more pressure sensors for detecting water pressure at one or more locations within the sanitaryware, valves, or plumbing lines.

A controller may comprise a timer or clock, such that a controller may determine a length of time a user is present at a sanitaryware fixture. A length of time may be associated with liquid or solid waste. In some embodiments, a bowl status determination based on ToF may be confirmed with a determination made with a timer. In some embodiments, without confirmation, only a low volume flush will be performed. "Without confirmation" may mean if a timer determines one of liquid or solid waste and an ultrasonic sensor determines the other of liquid or solid waste. If required, a manual override actuator may be employed to provide a further flush. In some embodiments, a manual override actuator may provide a feature to initiate a low volume flush or a high volume flush. In other embodiments, without confirmation, a controller may employ data from a timer or an ultrasonic sensor as a default over the other in regard to determining a bowl status.

In some embodiments, an ultrasonic sensor may be placed on a sanitaryware bowl underside, in some embodiments, directly beneath and substantially centered relative to a water seal. In some embodiments, with a toilet bowl having a trapway inlet and jet outlet in a sump area, an ultrasonic sensor may be positioned on a bowl underside and substantially centered between a trapway inlet and jet outlet in x-y directions.

In some embodiments, a method of coupling an ultrasonic sensor to a bowl may include machining a bowl surface to remove a glaze. In some embodiments, an adhesive, comprising one or more different adhesives, may be employed to affix an ultrasonic sensor to a sanitaryware device. In some embodiments, a sanitaryware fixture may include a pocket or recess configured to receive an ultrasonic sensor. A thickness of a sanitaryware fixture may be somewhat thinner in a recess area to facilitate ultrasonic signal transmission. In some embodiments, an adhesive includes a 2-part methylmethacrylate adhesive. In other embodiments, an adhesive includes an alkylcyanoacrylate ester adhesive. In certain embodiments, certain parts of an ultrasonic sensor are affixed with a 2-part methylmethacrylate adhesive, and other distinct parts are affixed with an alkylcyanoacrylate ester adhesive. In some embodiments, an ultrasonic sensor is electrically coupled to a controller via a wire, wherein the wire runs from underneath a bowl and directly behind a wall to a concealed assembly, or from underneath a bowl and directly on a rear side of an exposed flush valve assembly through a wire cover or housing positioned on a water outlet pipe.

In some embodiments, a sanitaryware status may include a normal state or an abnormal state. An abnormal state may include a clog state, a leak state, a slow-drain state, etc. A sanitaryware may communicate its status to a network gateway via a flush valve assembly antenna. Upon determination of an abnormal state, a controller may be configured to not send any flush signals to a flush valve, and to inform a technician via an internet-connected device. In some embodiments, upon determination of an abnormal state, a controller may be configured to send a signal to close an angle stop. A sanitaryware fixture may be part of a connected system, comprising a plurality of sanitaryware fixtures.

Following are some non-limiting embodiments of the disclosure.

In a first embodiment, disclosed is a flush valve assembly for an automatic sanitaryware assembly, the flush valve assembly comprising a flush valve; a status sensor; a presence sensor associated with a presence sensor lens; an antenna associated with an antenna lens; a manual override actuator; and a controller, wherein the status sensor comprises one or more sensors selected from ultrasonic sensors and capacitive sensors, the status sensor, the presence sensor, and the antenna are in wired electrical communication with the controller, the status sensor is configured to be affixed to a sanitaryware assembly, the status sensor is configured to transmit signals to the controller, the controller is configured to analyze the signals and to determine a sanitaryware status based on the analysis, and the antenna is configured to transmit the sanitaryware status to a network gateway.

In a second embodiment, disclosed is a flush valve assembly according to the first embodiment, wherein the status sensor is an ultrasonic sensor configured to transmit and receive an ultrasonic signal through the sanitaryware assembly. In a third embodiment, disclosed is a flush valve assembly according to the first embodiment, wherein the status sensor comprises a first capacitive sensor and a second capacitive sensor. In a fourth embodiment, disclosed is a flush valve assembly according to any of the preceding embodiments, wherein the presence sensor is an infrared sensor. In a fifth embodiment, disclosed is a flush valve assembly according to embodiment 2, wherein the ultrasonic sensor is a piezo ultrasonic transducer.

In a sixth embodiment, disclosed is a flush valve assembly according to any of the preceding embodiments, wherein the antenna lens comprises a thermoplastic polymer, for example acrylonitrile-butadiene-styrene copolymer or acrylonitrile-styrene-acrylate copolymer.

In a seventh embodiment, disclosed is a flush valve assembly according to any of the preceding embodiments, wherein the flush valve is an exposed flush valve and the flush valve assembly comprises an upper housing and a lower housing, wherein the upper housing is coupled to the antenna lens, and wherein the upper housing contains the antenna; the presence sensor and associated presence sensor lens; the manual override actuator; and the controller. In an eighth embodiment, disclosed is a flush valve assembly according to embodiment 7, wherein the antenna lens is coupled to a top portion of the upper housing.

In a ninth embodiment, disclosed is a flush valve assembly according to any of embodiments 1 to 6, wherein the flush valve is a concealed flush valve and the flush valve assembly comprises a plate, wherein the plate is coupled to the antenna lens; the presence sensor lens; and the manual override actuator.

In a tenth embodiment, disclosed is a flush valve assembly according to embodiment 9, wherein the flush valve assembly comprises a box coupled to and concealed by the plate, and wherein the box comprises the antenna and is coupled to the antenna lens. In an eleventh embodiment, disclosed is a flush valve assembly according to embodiments 9 or 10, wherein the plate comprises a substantially rectangular-shaped, horizontally-aligned aperture comprising the antenna lens. In a twelfth embodiment, disclosed is a flush valve assembly according to any of embodiments 9 to 11, wherein the plate comprises an aperture comprising the presence sensor lens.

In a thirteenth embodiment, disclosed is a flush valve assembly according to any of the preceding embodiments, wherein the status sensor is configured to be in a default sleep mode and configured to be activated when the presence sensor detects a user. In a fourteenth embodiment, disclosed is a flush valve assembly according to any of the preceding embodiments, wherein the status sensor is configured to be in a default sleep mode, and configured to be periodically activated to transmit signals.

In a fifteenth embodiment, disclosed is an automatic sanitaryware assembly comprising the flush valve assembly according to any of embodiments 1 to 14. In a sixteenth embodiment, disclosed is a sanitaryware assembly according to embodiment 15, comprising a toilet, a bidet, or a urinal. In a seventeenth embodiment, disclosed is a sanitaryware assembly according to embodiment 16, wherein the status sensor is coupled to an exterior, underside of a bowl of the toilet, bidet, or urinal. In an eighteenth embodiment, disclosed is a sanitaryware assembly according to embodiment 17, wherein the status sensor is coupled to an underside of the bowl, directly under a water seal of the bowl.

In a nineteenth embodiment, disclosed is a sanitaryware assembly according to embodiments 17 or 18, wherein the status sensor is coupled to an un-glazed portion of the bowl. In a twentieth embodiment, disclosed is a sanitaryware assembly according to any of embodiments 17 to 19, wherein the bowl comprises a recess configured to receive the status sensor. In a twenty-first embodiment, disclosed is a sanitaryware assembly according to any of embodiments 17 to 20, wherein the status sensor is coupled to the bowl via an adhesive. In a twenty-second embodiment, disclosed is a sanitaryware assembly according to embodiment 21, wherein the adhesive comprises a two-part methylmethacrylate adhesive. In a twenty-third embodiment, disclosed is a sanitaryware assembly according to embodiments 21 or 22, wherein the adhesive comprises an alkylcyanoacrylate ester adhesive. In a twenty-fourth embodiment, disclosed is a sanitaryware assembly according to any of embodiments 21 to 23, wherein the adhesive comprises a) a two-part methylmethacrylate adhesive and b) an alkylcyanoacrylate ester adhesive, and wherein a) and b) are applied to separate parts of the ultrasonic sensor.

In a twenty-fifth embodiment, disclosed is a flush valve assembly according to any of the preceding flush valve assembly embodiments, comprising an electromechanical valve, for example a solenoid valve, in electrical communication with the controller.

The term "adjacent" may mean "near" or "close-by" or "next to".

The term "coupled" means that an element is "attached to" or "associated with" another element. Coupled may mean directly coupled or coupled through one or more other elements. An element may be coupled to an element through two or more other elements in a sequential manner or a non-sequential manner. The term "via" in reference to "via an element" may mean "through" or "by" an element. Coupled or "associated with" may also mean elements not directly or indirectly attached, but that they "go together" in that one may function together with the other.

The term "flow communication" means for example configured for liquid or gas flow there through and may be synonymous with "fluidly coupled". The terms "upstream" and "downstream" indicate a direction of gas or fluid flow, that is, gas or fluid will flow from upstream to downstream.

Likewise, "electrical communication" may mean "electrically coupled". Electrical communication may be via wired connection or may be wireless.

The term "towards" in reference to a of point of attachment, may mean at exactly that location or point or, alternatively, may mean closer to that point than to another distinct point, for example "towards a center" means closer to a center than to an edge.

The term "like" means similar and not necessarily exactly like. For instance "ring-like" means generally shaped like a ring, but not necessarily perfectly circular.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more. All numeric values are modified by the term "about" whether or not explicitly indicated. Numeric values modified by the term "about" include the specific identified value. For example "about 5.0" includes 5.0.

The term "substantially" is similar to "about" in that the defined term may vary from for example by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more of the definition; for example the term "substantially perpendicular" may mean the 90° perpendicular angle may mean "about 90°". The term "generally" may be equivalent to "substantially".

Features described in connection with one embodiment of the disclosure may be used in conjunction with other embodiments, even if not explicitly stated.

Embodiments of the disclosure include any and all parts and/or portions of the embodiments, claims, description and figures. Embodiments of the disclosure also include any and all combinations and/or sub-combinations of embodiments.

The invention claimed is:

1. A flush valve assembly for an automatic sanitaryware assembly, the flush valve assembly comprising
   an exposed flush valve;
   a status sensor;
   a presence sensor associated with a presence sensor lens;
   an antenna associated with an antenna lens;
   a manual override actuator; and
   a controller,
   wherein
   the exposed flush valve comprises an upper housing and a lower housing,
   the antenna lens is a cap coupled to and covering a top of the upper housing,
   the upper housing contains the antenna, the presence sensor and associated presence sensor lens, the manual override actuator, and the controller,
   the status sensor comprises one or more sensors selected from ultrasonic sensors and capacitive sensors,
   the status sensor, the presence sensor, and the antenna are in wired electrical communication with the controller,
   the status sensor is configured to be affixed to a sanitaryware assembly,
   the status sensor is configured to transmit signals to the controller,
   the controller is configured to analyze the signals and to determine a sanitaryware status based on the analysis, and
   the antenna is configured to transmit the sanitaryware status to a network gateway.

2. The flush valve assembly according to claim 1, wherein the status sensor is an ultrasonic sensor configured to transmit and receive an ultrasonic signal through the sanitaryware assembly.

3. The flush valve assembly according to claim 2, wherein the ultrasonic sensor is a piezo ultrasonic transducer.

4. The flush valve assembly according to claim 1, wherein the status sensor comprises a first capacitive sensor and a second capacitive sensor.

5. The flush valve assembly according to claim 1, comprising an electromechanical valve electrically coupled to the controller.

6. The flush valve assembly according to claim 1, wherein the antenna lens comprises acrylonitrile-butadiene-styrene copolymer or acrylonitrile-styrene-acrylate copolymer.

7. The flush valve assembly according to claim 1, wherein the status sensor is configured to be in a default sleep mode and configured to be activated when the presence sensor detects a user, and/or is configured to be periodically activated to transmit signals.

8. An automatic sanitaryware assembly comprising the flush valve assembly according to claim 1.

9. A flush valve assembly for an automatic sanitaryware assembly, the flush valve assembly comprising
   a concealed flush valve;
   a box and a plate;
   a status sensor;
   a presence sensor associated with a presence sensor lens;
   an antenna associated with an antenna lens;
   a manual override actuator; and
   a controller,
   wherein
   the box is coupled to and concealed by the plate and comprises the antenna and is coupled to the antenna lens,
   the plate is coupled to the antennal lens, the presence sensor lens, and the manual override actuator,
   the status sensor comprises one or more sensors selected from ultrasonic sensors and capacitive sensors,
   the status sensor, the presence sensor, and the antenna are in wired electrical communication with the controller,
   the status sensor is configured to be affixed to a sanitaryware assembly,
   the status sensor is configured to transmit signals to the controller,
   the controller is configured to analyze the signals and to determine a sanitaryware status based on the analysis, and
   the antenna is configured to transmit the sanitaryware status to a network gateway.

10. The flush valve assembly according to claim 9, wherein the plate comprises a substantially rectangular-shaped, horizontally-aligned aperture comprising the antenna lens.

11. The flush valve assembly according to claim 9, wherein the plate comprises an aperture comprising the presence sensor lens.

12. The flush valve assembly according to claim 9, wherein the status sensor is an ultrasonic sensor configured to transmit and receive an ultrasonic signal through the sanitaryware assembly.

13. The flush valve assembly according to claim 12, wherein the ultrasonic sensor is a piezo ultrasonic transducer.

14. The flush valve assembly according to claim 9, wherein the status sensor comprises a first capacitive sensor and a second capacitive sensor.

15. The flush valve assembly according to claim 9, comprising an electromechanical valve electrically coupled to the controller.

16. The flush valve assembly according to claim 9, wherein the antenna lens comprises acrylonitrile-butadiene-styrene copolymer or acrylonitrile-styrene-acrylate copolymer.

17. The flush valve assembly according to claim 9, wherein the status sensor is configured to be in a default sleep mode and configured to be activated when the presence sensor detects a user, and/or is configured to be periodically activated to transmit signals.

18. An automatic sanitaryware assembly comprising the flush valve assembly according to claim 9.

* * * * *